(12) United States Patent  
Wang et al.

(10) Patent No.: US 9,414,140 B2
(45) Date of Patent: Aug. 9, 2016

(54) ELECTRONIC DEVICE

(71) Applicant: COMPAL ELECTRONICS, INC., Taipei (TW)

(72) Inventors: Shing-Da Wang, Taipei (TW); Chih-Wen Chiang, Taipei (TW); Chang-Yuan Wu, Taipei (TW); Yi-Chang Wu, Taipei (TW); Hsin-Chih Hsiao, Taipei (TW); Yen-Ling Liu, Taipei (TW); Chien-Chu Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 237 days.

(21) Appl. No.: 14/101,371

(22) Filed: Dec. 10, 2013

(65) Prior Publication Data

US 2014/0161293 A1    Jun. 12, 2014

Related U.S. Application Data

(60) Provisional application No. 61/735,522, filed on Dec. 10, 2012.

(51) Int. Cl.
*H04R 1/02* (2006.01)
*H04R 1/44* (2006.01)
*H04M 1/03* (2006.01)

(52) U.S. Cl.
CPC .................. *H04R 1/021* (2013.01); *H04R 1/44* (2013.01); *H04M 1/035* (2013.01); *H04R 1/026* (2013.01); *H04R 2499/11* (2013.01)

(58) Field of Classification Search
CPC .......... H04R 1/02; H04R 1/021; H04R 1/023; H04R 1/30; H04R 1/28; H04R 1/2803; H04R 1/2807; H04R 1/2811; H04R 2499/11; H04R 2499/15
USPC ......... 381/332, 333, 386, 388, 306, 325, 346, 381/347
See application file for complete search history.

(56) References Cited

U.S. PATENT DOCUMENTS 5,790,679 A * 8/1998 Hawker ............... H04M 1/0202
                                                        379/388.02
6,486,398 B1 * 11/2002 McCulloch ......... B60R 16/0222
                                                        174/539

FOREIGN PATENT DOCUMENTS

JP          61251296 A  * 11/1986
JP        2006238181 A  *  9/2006

* cited by examiner

*Primary Examiner* — Sunita Joshi
(74) *Attorney, Agent, or Firm* — CKC & Partners Co., Ltd.

(57) ABSTRACT

An electronic device includes a case, a speaker, a supporting stand, and a waterproof breathable membrane. The case includes a first inner space and a through hole connected to the first inner space. The speaker is disposed in the first inner space, and produces sound waves outwards from the through hole. The supporting stand connects the case to cover the through hole. The supporting stand includes a sound hole and a second inner space connected to the sound hole and the through hole. The waterproof breathable membrane covers one of the sound hole and the through hole.

14 Claims, 14 Drawing Sheets

ELECTRONIC DEVICE

RELATED APPLICATIONS

This application claims priority to U.S. Provisional Application Ser. No. 61/735,522, filed Dec. 10, 2012, which is herein incorporated by reference.

BACKGROUND

1. Field of Disclosure

The present disclosure relates to an electronic device. More particularly, the present disclosure relates to an electronic device having a speaker.

2. Description of Related Art

FIG. 1A is a schematic view of a conventional speaker being collaborative with a sound-outlet decoration cover. Referring to FIG. 1A, a normal portable electronic device 1 (e.g. notebook computer, mobile phone or handheld game console) is provided with a speaker 2 installed in a recess of the portable electronic device 1. A sound-outlet decoration cover 3 is assembled to cover the recess for sheltering and protecting the speaker 2, and the sound-outlet decoration cover 3 is formed with a plurality of sound holes thereon for meeting the requirement of appearance design of the portable electronic device 1. As such, a gap G is needed between the sound-outlet decoration cover 3 and the speaker 2 so as to prevent a diaphragm 21 of the speaker 2 from being interfered by the sound-outlet decoration cover while the diaphragm 21 is vibrating.

In the prior art, for example, a portable electronic device is disclosed by a Taiwanese patent publication number TW 201221011, published on May 16, 2012. FIG. 1B, is the same as FIG. 5 of TW 201221011 showing a side view of a conventional electronic device, with only modified reference numbers and the figure numbers. Referring to FIG. 1B, the portable electronic device 5 includes a flat case 51 formed with an inclined portion 52 having sound holes 53 thereon on a rear face 51R of the portable electronic device 5, and a speaker 54 is arranged inside the flat case 51 corresponding to the sound holes 53.

However, since the gap (G, FIG. 1A) is required between the inclined portion 52 and the speaker 54, the gap increases the whole thickness of the speaker 54 in the portable electronic device 5 and thus hinders the electronic device becoming compact in size.

As mentioned above, the electronic device in the art still has shortages and disadvantages. How to effectively improve the mentioned shortages and disadvantages should be seriously concerned by the skilled people in the art.

SUMMARY

In view of the above, an object of the present disclosure is to provide an electronic device for solving the mentioned disadvantages existed in prior art.

In order to achieve the aforementioned object, according to an embodiment, an electronic device includes a case, a speaker, a supporting stand, and a waterproof breathable membrane. The case includes a front surface, a rear surface being opposite to the front surface, a first inner space disposed between the front surface and the rear surface, and a through hole disposed on the rear surface and connected to the first inner space. The speaker is disposed in the first inner space, and produces sound waves outwards the case from the through hole. The supporting stand is connected to the rear surface of the case to cover the through hole. The supporting stand includes at least one sound hole and a second inner space connected to the sound hole and the through hole. The waterproof breathable membrane covers one of the through hole and the sound hole.

Thus, since the speaker has been covered by the supporting stand, the aforementioned sound-outlet decoration cover for beautifying the external appearance thereof is no longer needed, so as to be advantageous for decreasing the whole thickness and the whole volume of the electronic device. Also, since the waterproof breathable membrane blocks the through hole or the sound hole from being in communication with the first inner space, water vapor or dusts is not easy to enter the first inner space of the case so as to decrease the possibility of the electronic device been damaged by water vapor or dusts.

According to one or more embodiments, the penetration direction of the sound hole of the supporting stand is same as the penetration direction of the through hole.

According to one or more embodiments, the sound hole is disposed on one side of the supporting stand farthest away from the rear surface of the case.

According to one or more embodiments, the penetration direction of the sound hole of the supporting stand intersects the penetration direction of the through hole.

According to one or more embodiments, the hole is disposed on one side of the supporting stand adjoined to the rear surface of the case.

According to one or more embodiments, the number of the sound hole and the waterproof breathable membrane respectively are plural, the sound holes are respectively disposed on two opposite sides of the supporting stand adjoined to the rear surface of the case, and are respectively covered by the waterproof breathable membranes.

According to one or more embodiments, the number of the at least one sound hole are plural, the sound holes are disposed on two opposite sides of the supporting stand adjoined to the rear surface of the case, and the waterproof breathable membrane covers the through hole.

According to one or more embodiments, the waterproof breathable membrane is formed with a first fastening structure, and the case is formed with a second fastening structure. When the first fastening structure and the second fastening structure are engaged with each other, the waterproof breathable membrane fixedly covers the through hole.

According to one or more embodiments, the waterproof breathable membrane is formed with a first fastening structure, and the supporting stand is formed with a third fastening structure. When the first fastening structure and the third fastening structure are engaged with each other, the waterproof breathable membrane fixedly covers the sound hole.

According to one or more embodiments, the electronic device further includes an adhesive layer enabling the waterproof breathable membrane to fixedly cover the through hole or the sound hole.

According to one or more embodiments, the waterproof breathable membrane includes polymer waterproof material of polytetrafluoroethene.

According to one or more embodiments, the thickness of the waterproof breathable membrane is in a range of 0.01 mm to 0.25 mm.

According to one or more embodiments, the waterproof breathable membrane is a diaphragm.

According to one or more embodiments, the speaker includes a driver element and a diaphragm. The diaphragm connects the driver element, and is disposed between the through hole and the driver element.

As what has been disclosed above, the technical solution provided by the present disclosure is novel and more practical comparing to conventional arts. With the provided technical solution, the present disclosure at least has following advantages:

1. The electronic device of the disclosure can omit the aforementioned sound-outlet decoration cover, so as to be advantageous for the electronic device becoming tiny and thinner.

2. The hollow supporting stand of the electronic device of the disclosure functions as a resonance speaker box, so as to be advantageous for increasing the sound volume of the speaker thereof.

3. The electronic device of the disclosure improves the sound quality of the speaker as the waterproof breathable membrane and the speaker mutually resonate.

4. The electronic device of the disclosure veils sound holes from the outer surface of the electronic device so as to be advantageous for simplifying and beautifying the external appearance of the electronic device.

The above description is merely used for illustrating the problems to be resolved, the technical methods for resolving the problems and their efficacies, etc. The specific details of the present disclosure will be explained in the below embodiments and related drawings.

BRIEF DESCRIPTION OF THE DRAWINGS

The disclosure may be more fully understood by reading the following detailed description of the embodiment, with reference made to the accompanying drawings as follows.

DETAILED DESCRIPTION

The following embodiments are disclosed with accompanying diagrams for detailed description. For illustration clarity, many details of practice are explained in the following descriptions. However, it should he understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

First Embodiment

Figure 2:
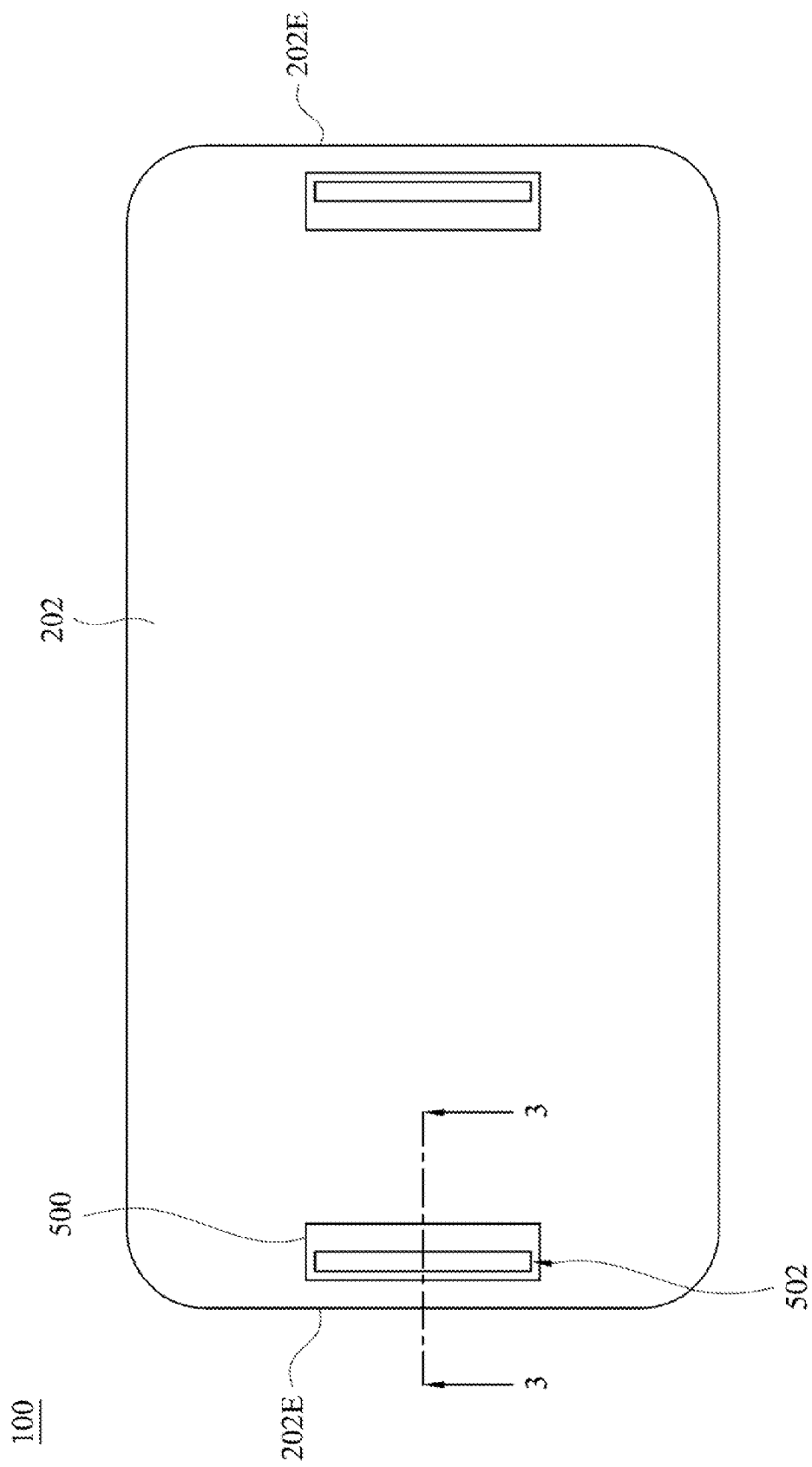
FIG. 2 is a bottom view of an electronic device according to a first embodiment of the disclosure.
Figure 3:
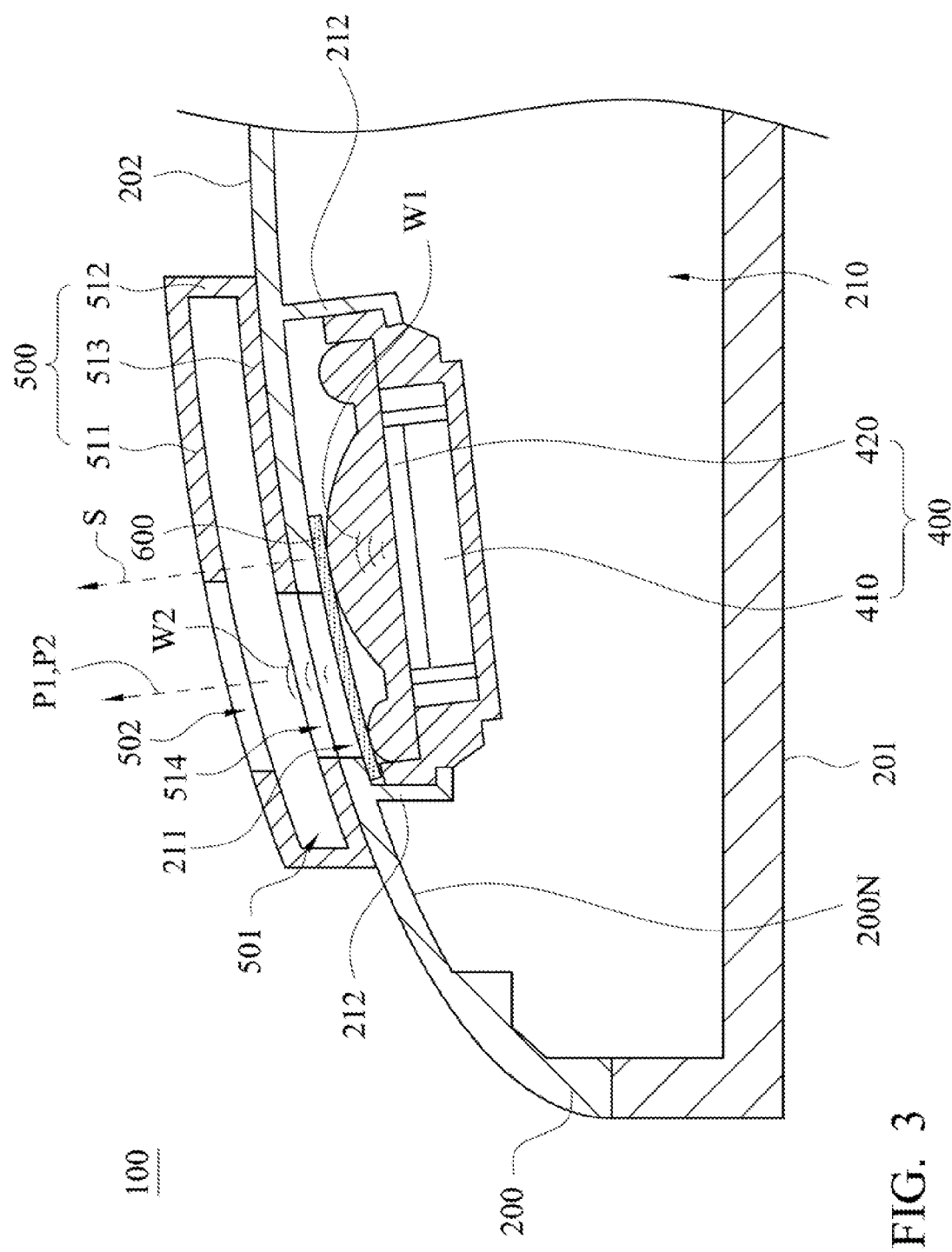
FIG. 3 is a cross sectional view of FIG. 2 taken along line 3-3.

Reference is now made to FIG. 2 and FIG. 3 in which FIG. 2 is a bottom view of an electronic device according to a first embodiment of the disclosure, and FIG. 3 is a cross sectional view of FIG. 2 taken along line 3-3. As shown in FIG. 2 and FIG. 3, in the first embodiment, the electronic device 100 includes a case 200, a speaker 400, and at least one supporting stand 500. The case 200 includes a front surface 201, a rear surface 202, a first inner space 210 and at least one through hole 211. The front surface 201 is disposed opposite to the rear surface 202, and the first inner space 210 is disposed between the front surface 201 and the rear surface 202, and the through hole 211 is disposed on the rear surface 202, and is connected to the first inner space 210. The speaker 400 is disposed in the first inner space 210, and produces sound waves outwards the case 200 from the through hole 211. The supporting stand 500 connects to the rear surface 202 of the case 200 to cover the through hole 211. The supporting stand 500 includes a second inner space 501 and a sound hole 502. The second inner space 501 is connected to the sound hole 502 and the through hole 211 of the case 200.

Figure 1A:
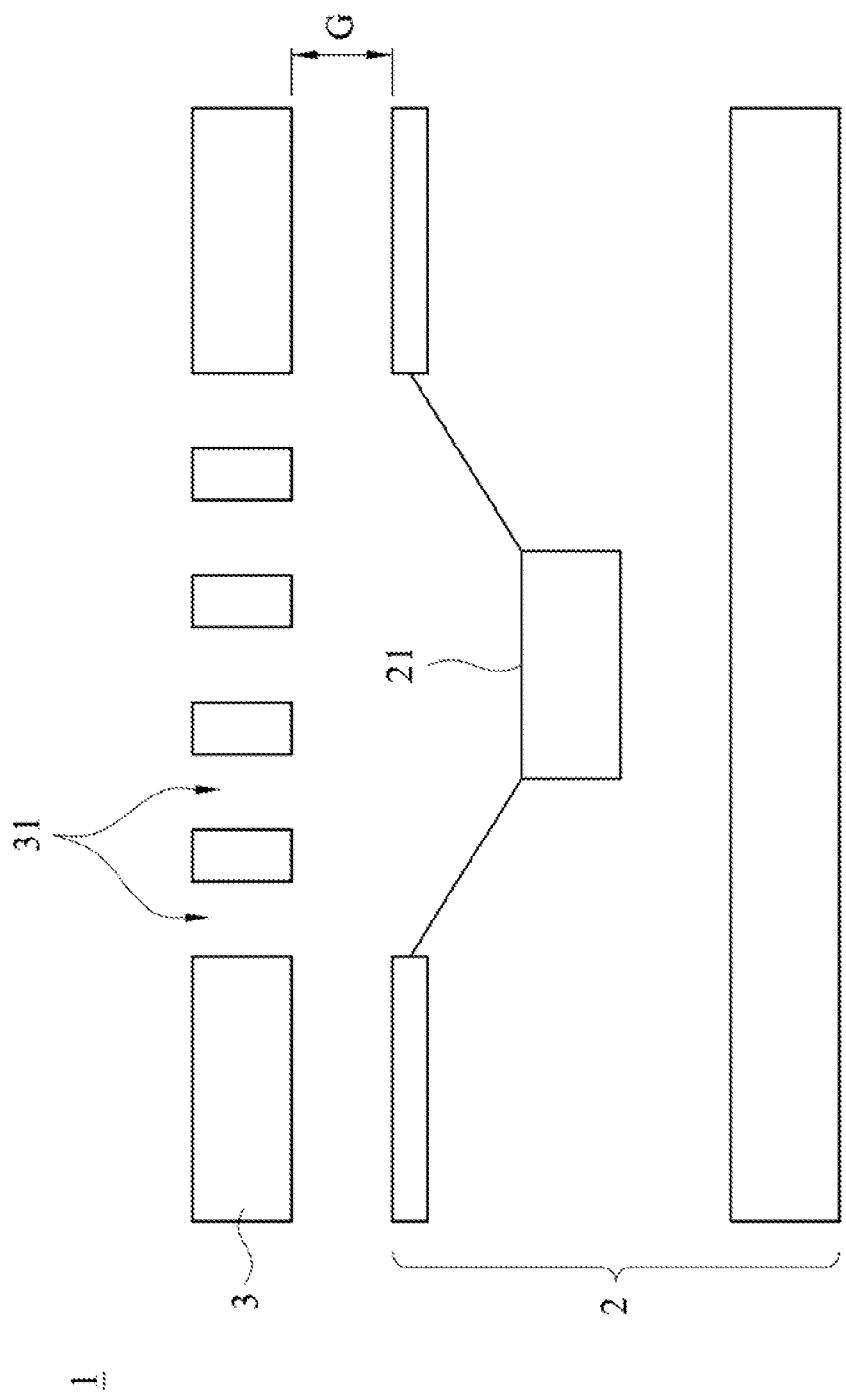
FIG. 1A is a schematic view of a conventional speaker being collaborative with a sound-outlet decoration cover.
Figure 1B:
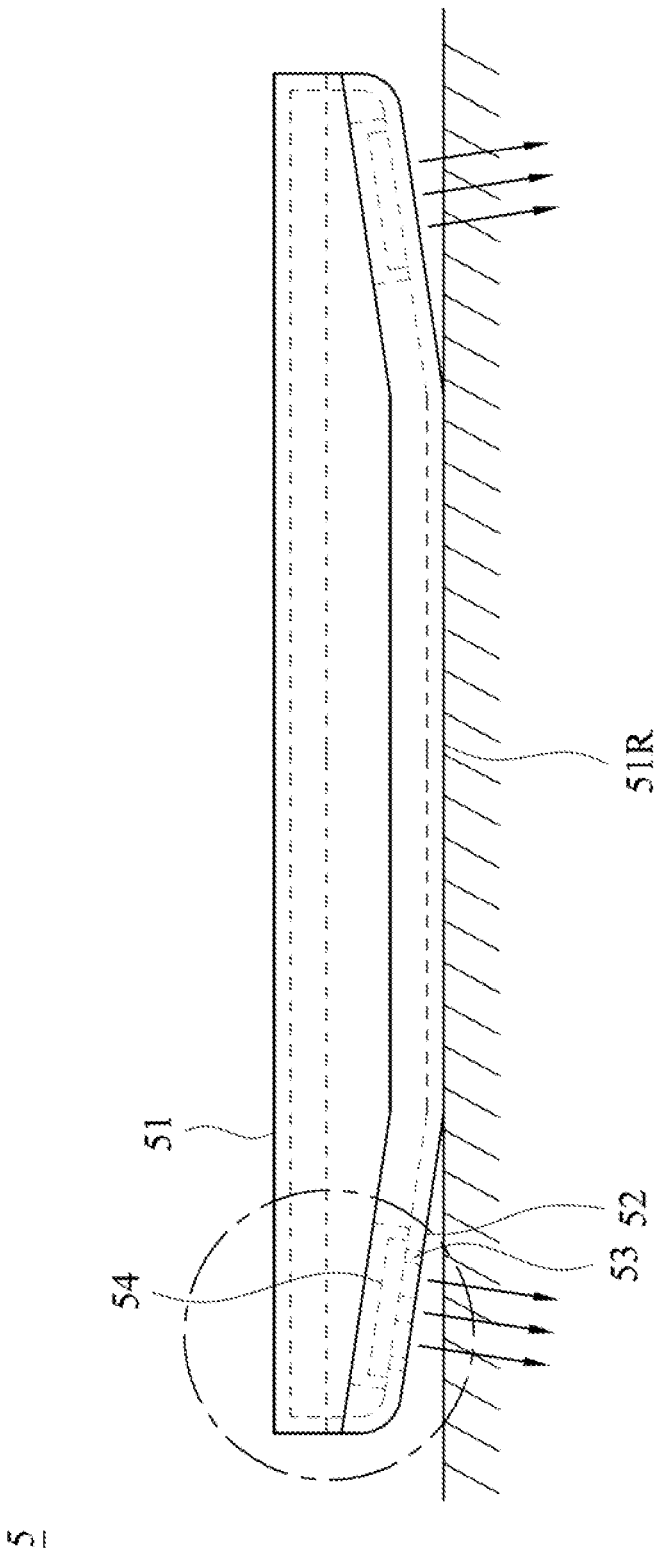
FIG. 1B is a side view of a conventional electronic device.

Thus, in the first embodiment, since the through hole 211 of the case 200 is covered by the supporting stand 500, the aforementioned sound-outlet decoration cover 3 (FIG. 1A) for sheltering and protecting the speaker 400 is not needed by the electronic device 100, so that the first embodiment can save the material cost of the aforementioned sound-outlet decoration cover 3 (FIG. 1A), and decrease the thickness of the aforementioned sound-outlet decoration cover 3 from the whole thickness of the electronic device 100. Similarly, because the aforementioned sound-outlet decoration cover 3 (FIG. 1A) is not needed in the first embodiment, the gap existed between the sound-outlet decoration cover 3 and the speaker 2 either is not needed so as to be advantageous for decreasing the whole thickness and the whole volume of the electronic device 100.

In the first embodiment, in order to avoid water vapor or dusts from getting into the first inner space 210 of the case 200 via the through hole 211, the electronic device 100 further includes a waterproof breathable membrane 600 completely covering the through hole 211 for blocking water vapor or dusts from getting into the first inner space 210 of the case 200 via the through hole 211 so as to decrease the possibility of the electronic device been damaged. For example, as shown in FIG. 3, the waterproof breathable membrane 600 covers both the case 200 and the through hole 211 for easily achieving the purpose of completely covering the through hole 211. However, in other embodiment, the waterproof breathable membrane also can be optioned to cover both the outer surface of the base and the through hole, or only to be fully filled in the through hole for achieving the purpose of completely covering the through hole.

Furthermore, since the waterproof breathable membrane 600 is disposed between the first inner space 210 and the second inner space 501, and the waterproof breathable membrane 600 allows air flows communicating between the first inner space 210 and the second inner space 501, but blocks water vapor or dusts from getting into the first inner space 210 of the base 200. Also, since the waterproof breathable membrane 600 essentially is a diaphragm, when the speaker 400 provides first sound waves W1 to the through hole 211, the first sound waves W1 vibrate the waterproof breathable membrane 600 on the through hole 211, and the waterproof breathable membrane 600 is vibrated to provide second sound waves W2 instead of the first sound waves W1 outwards the electronic device 100 from the sound hole 502 of the supporting stand 500.

It is noted that because the waveform of the first sound waves W1 from the speaker 400 and the waveform of the second sound waves W2 from the waterproof breathable membrane 600 are the same, or at least substantially the same, the waterproof breathable membrane 600 will not degrade the original sound quality provided from the speaker 400. Moreover, in the first embodiment, the waterproof breathable membrane 600 in some vibration frequencies can be mutually resonated with a diaphragm of the speaker 400, so as to improve the sound quality of the speaker 400 in high frequency.

Specifically, the speaker 400 at least includes a driver element 410 and a diaphragm 420. The diaphragm 420 connects the driver element 410, and is disposed between the through hole 211 and the driver element 410. Thus, when the speaker 400 works, by the driver element 410 generating electromagnetic effects, the diaphragm 420 is driven to vibrate and provide the first sound waves W1 to the through hole 211 in which the sound traveling direction S of the first sound waves W1 provided from the speaker 400 can be defined as a vibration direction of the diaphragm 420.

As shown in FIG. 3 again, particularly, the supporting stand 500 is formed with a first lateral portion 511, plural second lateral portions 512 and a third lateral portion 513. The third lateral portion 513 is in contact with the rear surface 202 of the case 200. The first lateral portion 511 is disposed opposite to the third lateral portion 513, and is one of the sides of the supporting stand 500 farthest away from the case 200. The plural second lateral portions 512 surround and adjoin the first lateral portion 511 and the third lateral portion 513 so that the second inner space 501 is mutually defined by the first lateral portion 511, the plural second lateral portions 512 and the third lateral portion 513

Also, the third lateral portion 513 is formed with an opening 514. The opening 514 is linearly aligned with the through hole 211 exactly, and is connected to the through hole 211 so as to connect the first inner space 210 and the second inner space 501 together.

In the first embodiment, the sound traveling direction S of the first sound waves W1 from the speaker 400 is same as the penetration direction P1 of the through hole 211 penetrating through the second surface 202 towards the first inner space 210, and the penetration direction P1 of the through hole 211 (or the opening 514) is same as the penetration direction P2 of the sound hole 502 penetrating through the first lateral portion 511 to the supporting stand 500. Because the penetration directions of the through hole 211, the opening 514 and the sound hole 502 are all the same, and the through hole 211, the opening 514 and the sound hole 502 are linearly aligned in line exactly, The second sound waves W2 provided from the waterproof breathable membrane 600 can be smoothly launched outwards from the sound hole 502 through the through hole 211 and the opening 514 without interference thereby avoiding the second sound waves W2 from over colliding in the second inner space 501 to be weakened its sound intensity.

Additionally, by utilizing the hollow supporting stand 500 as a resonance speaker box, the sound amplitude of the second sound waves W2 provided from the waterproof breathable membrane 600 can be enhanced, so as to save electric power of the speaker 400.

In this first embodiment, in order to rapidly and precisely position the speaker 400 to the through hole 211 of the case 200, the case 200 further includes two position hooks 212. The two position hooks 212 are respectively disposed on an inner wall 200N of the case 200 opposite to the supporting stand 500, and the through hole 211 is arranged between the two position hooks 212. Thus, when installing the speaker 400 on the case 200, the speaker 400 only needs to be placed onto the two position hooks 212 so as to rapidly and precisely position the speaker 400 to the through hole 211 of the case 200.

Refer to FIG. 2 again, for steadily putting the electronic device 100 on a placement plane (not shown in figures), in the first embodiment, at least two supporting stands 500 are respectively arranged on the two opposite edges 202E of the rear surface 202 of the case 200. Thus, because the supporting stands 500 support the case 200, not only air flows can pass through between the rear surface 202 of the case 200 and the placing plane for heat-radiation, but also the electronic device 100 can be protected to decrease the possibility of being damaged from shock or friction.

Second Embodiment

Figure 4:
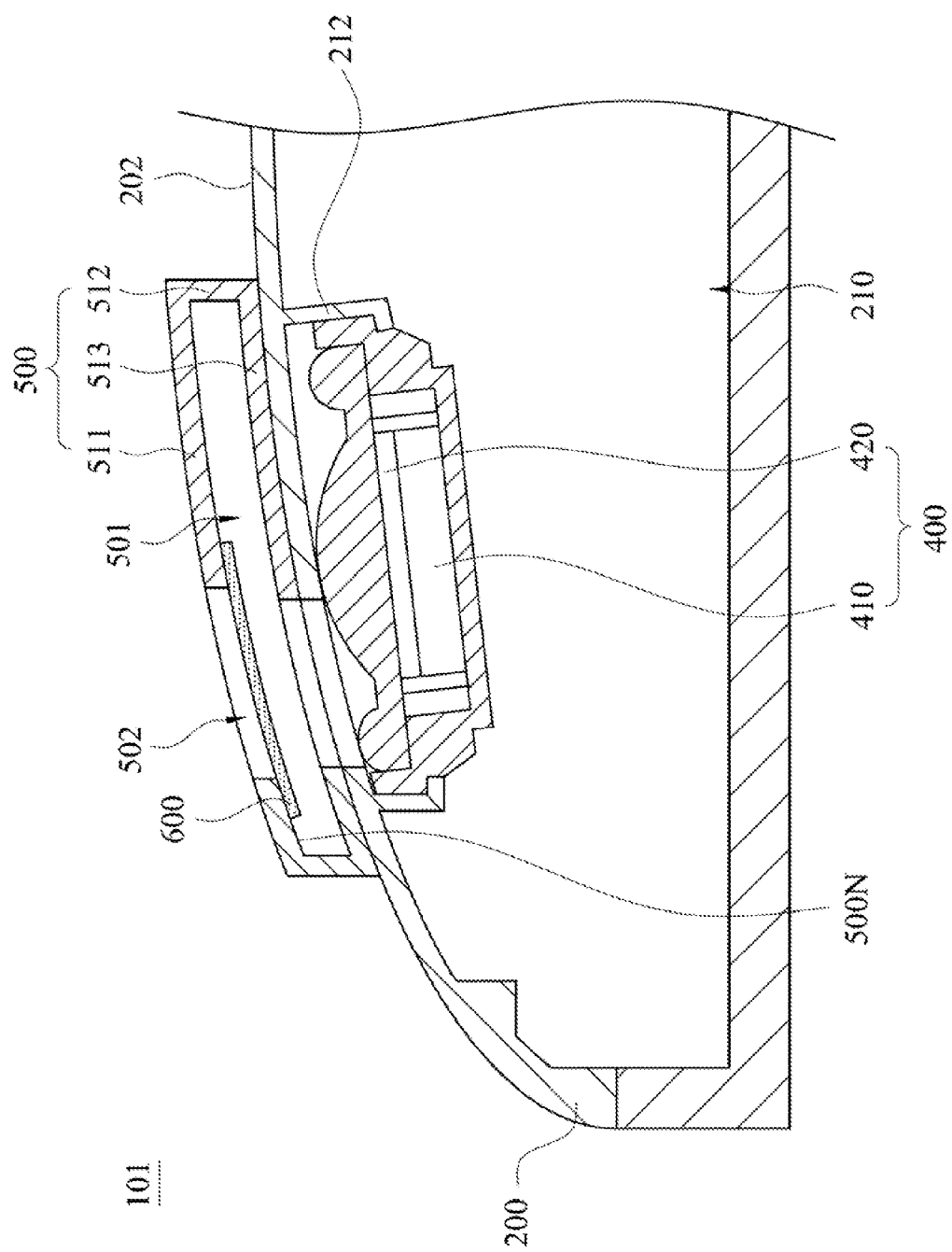
FIG. 4 is a cross sectional view of an electronic device according to a second embodiment of the disclosure, wherein the crossed location is the same as FIG. 3.

FIG. 4 is a cross sectional view of an electronic device 101 according to a second embodiment of the disclosure, wherein the crossed location is the same as FIG. 3. The electronic device 101 of the second embodiment is substantially the same as the electronic device 100 of the first embodiment except that the waterproof breathable membrane 600 in the second embodiment completely covers the sound hole 502 of the first lateral portion 511. For example, as shown in FIG. 4, the waterproof breathable membrane 600 completely covers both the inner surface 500N of the supporting stand 500 and the sound hole 502 for achieving the purpose of completely covering the sound hole 502. However, in other embodiment, the waterproof breathable membrane also can be optioned to cover both the outer surface of the supporting stand and the sound hole, or only to be fully filled in the sound hole for achieving the purpose of completely covering the sound hole.

Thus, since the waterproof breathable membrane 600 blocks between the outside and the second inner space 501 of the supporting stand 500, water vapor or dusts can be more effectively blocked from getting into the second space 501 of the supporting stand 500 via the sound hole 502, and only allows air flows communicating between the outside and the second inner space 501 of the supporting stand 500 and the second inner space 501 so as to decrease the possibility of the electronic device 101 been damaged.

Additionally, since the hollow supporting stand 500 can be used resonance speaker box of the speaker 400, the second sound waves having greater sound amplitude can be provided to the waterproof breathable membrane 600.

Third Embodiment

Figure 5:
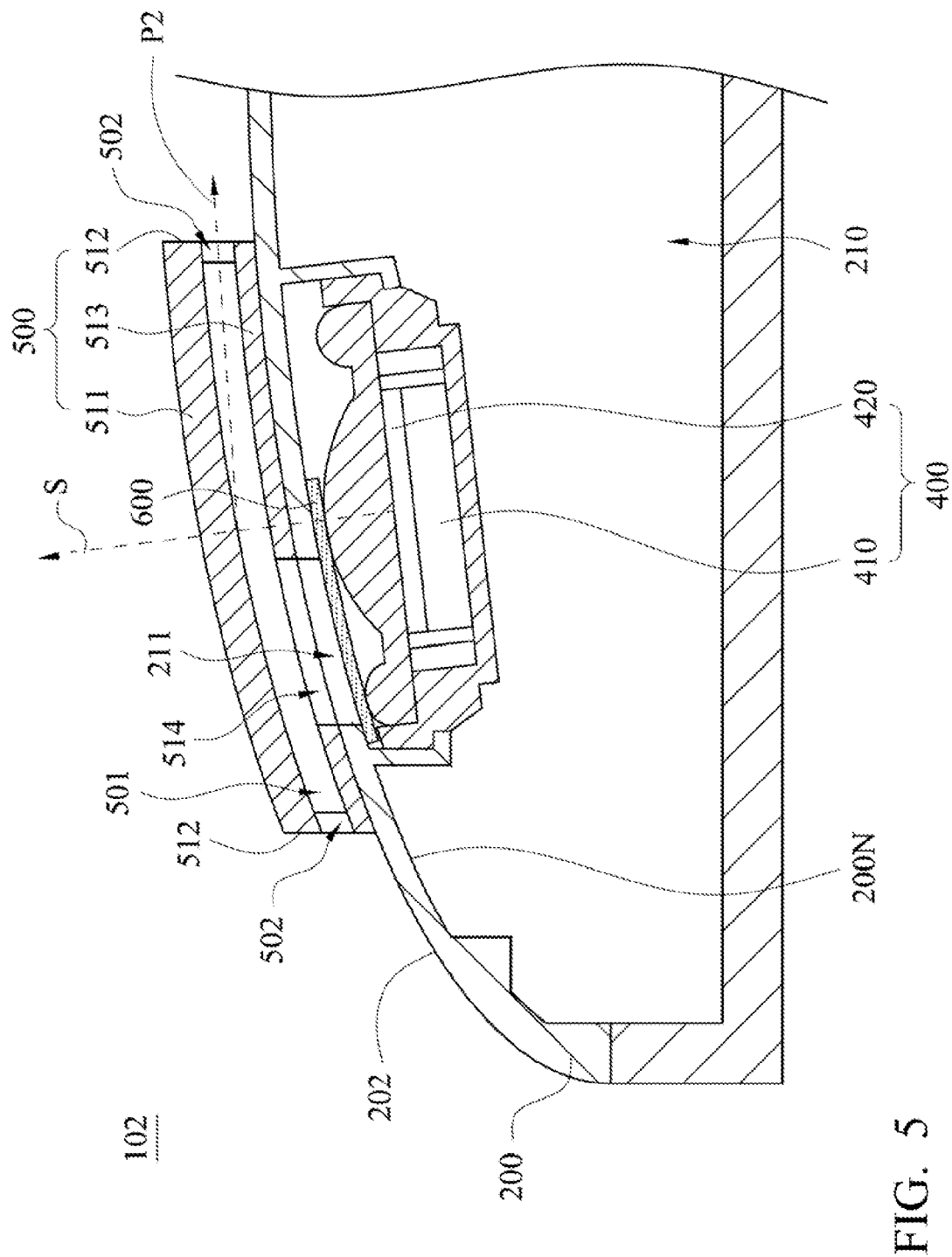
FIG. 5 is a cross sectional view of an electronic device according to a third embodiment of the disclosure, wherein the crossed location is the same as FIG. 3.

FIG. 5 is a cross sectional view of an electronic device 102 according to a third embodiment of the disclosure, wherein the crossed location is the same as FIG. 3. The electronic device 102 of the third embodiment is substantially same as the electronic device 100 of the first embodiment except that the sound hole 502 in the third embodiment penetrates through one of the second lateral portions 512 of the supporting stand 510, that is, the penetration direction P2 of the sound hole 502 is different to the sound traveling direction S of the speaker 400, and intersects to the sound traveling direction S of the speaker 400. In particular, two sound holes 502 are respectively arranged on two second lateral portions 512 of the supporting stand 510 oppositely arranged with each other, and the waterproof breathable membrane 600 still completely covers the through hole 211 of the case 200.

For example, as shown in FIG. 5, the waterproof breathable membrane 600 covers both the inner surface 200N of the case 200 and the through hole 211 for easily achieving the purpose of completely covering the through hole 211. However, in other embodiment, the waterproof breathable membrane also can be optioned to cover both the outer surface of the base and the through hole, or only to be fully filled in the through hole for achieving the purpose of completely covering the through hole.

Thus, when the electronic device 102 is placed flat on a placement plane (not shown in figures) with the first lateral portion 511 of the supporting stand 510, since the sound holes 502 are respectively arranged on the two second lateral portions 512 of the supporting stand 510 oppositely arranged with each other, the sound holes 502 will not be covered and blocked by the placement plane. Thus, not only the sound intensity of the speaker 400 will not be weakened, but also the sound holes 502 provide two sound output directions opposite to each other.

Fourth Embodiment

Figure 6:
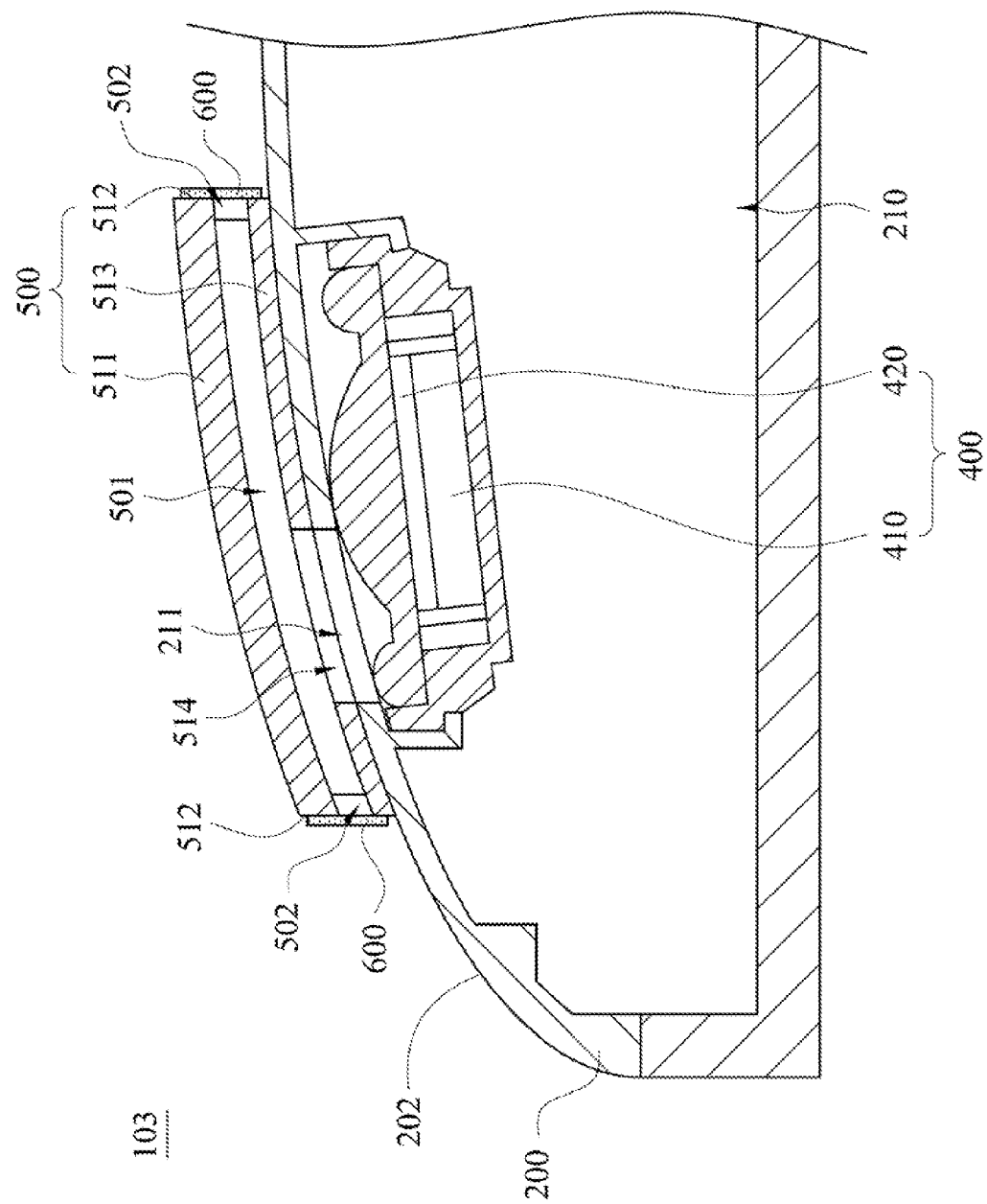
FIG. 6 is a cross sectional view of an electronic device according to a fourth embodiment of the disclosure, wherein the crossed location is the same as FIG. 3.

FIG. 6 is a cross sectional view of an electronic device 103 according to a fourth embodiment of the disclosure, wherein the crossed location is the same as FIG. 3. The electronic device 103 of the Fourth embodiment is substantially same as the electronic device 102 of the third embodiment except that two waterproof breathable membranes 600 respectively cover the two sound holes 502 completely, rather than cover the through hole 211 For example, as shown in FIG. 6, each of the waterproof breathable membranes 600 completely covers both the outer surface of the second lateral portion 512 and the sound hole 502 for easily achieving the purpose of completely covering the sound hole 502. However, in other embodiment, the waterproof breathable membrane also can be optioned to cover both the inner surface of the second lateral portion and the sound hole, or only to be fully filled in the sound hole for achieving the purpose of completely covering the sound hole.

Thus, as mentioned above, in the embodiment, since the two sound holes 502 of the supporting stand 510 are oppositely arranged, not only the sound holes 502 will not be covered and blocked by the placement plane so that the sound intensity of the speaker 400 will not be weakened, but also bi-directional sound outputs are provided on the supporting stand 510 so as to produce stereo sound effect.

Furthermore, since the two sound holes 502 of the supporting stand 510 oppositely arranged are completely covered by the two waterproof breathable membranes 600, respectively, each of the waterproof breathable membranes 600 blocks between the outside and the second inner space 501 of the supporting stand 510, water vapor or dusts can be more effectively blocked from getting into the second space 501 of the supporting stand 510 via the sound hole 502, and only allows air flows communicating between the outside and the second inner space 501 of the supporting stand 500 and the second inner space 501 so as to decrease the possibility of the electronic device 103 been damaged.

Fifth Embodiment

Figure 7:
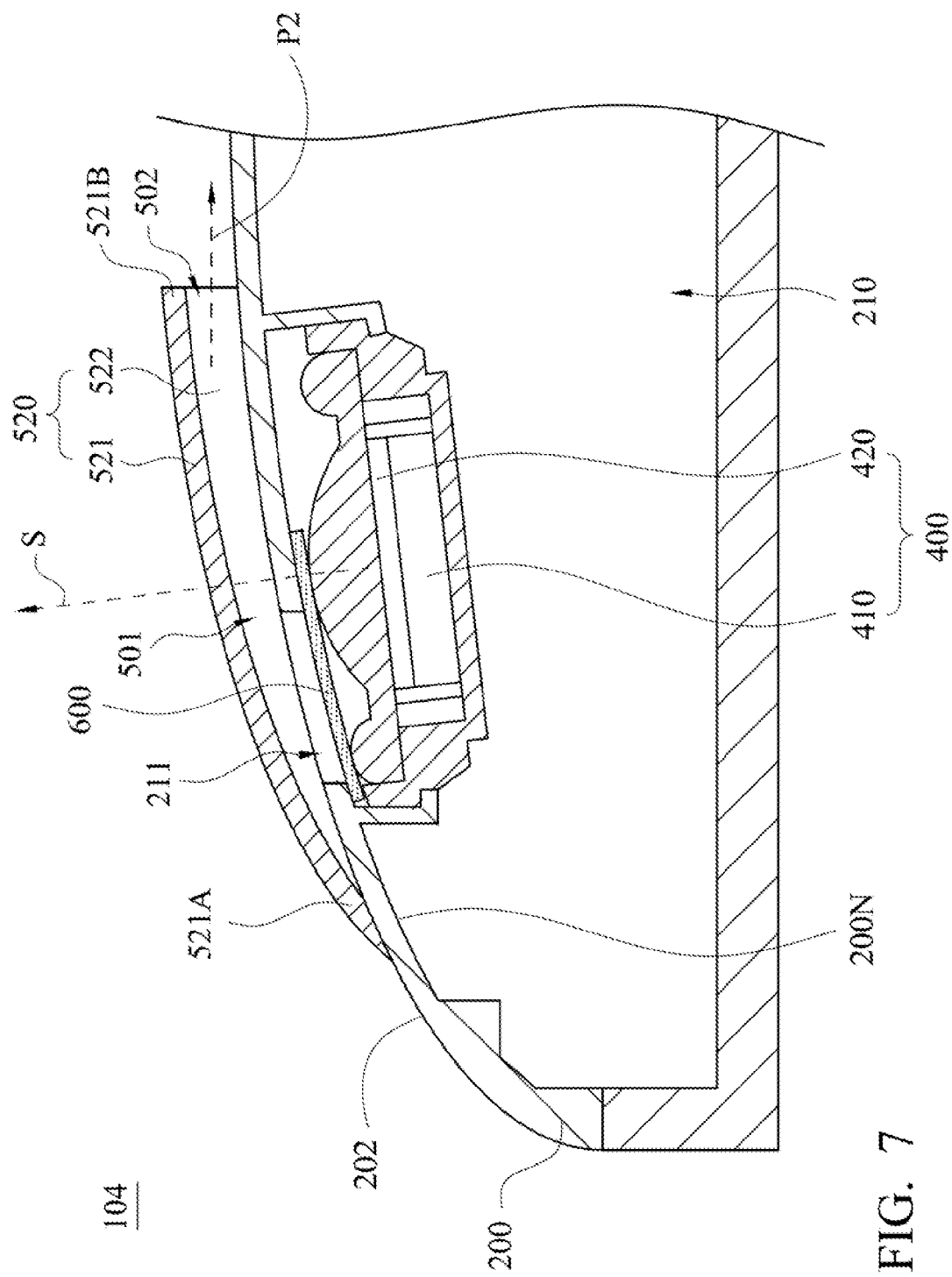
FIG. 7 is a cross sectional view of an electronic device according to a fifth embodiment of the disclosure, wherein the crossed location is the same as FIG. 3.

FIG. 7 is a cross sectional view of an electronic device according to a fifth embodiment of the disclosure, wherein the crossed location is the same as FIG. 3. In the fifth embodiment, the supporting stand 520 includes a first arc-shaped plate 521 and two side plates 522 (only one side plate is shown in FIG. 7). The first arc-shaped plate 521 is formed with two end portions 521A, 521B being opposite to each other. The end portion 521A of the first arc-shaped plate 521 is connected to the case 200, and the sound hole 502 is formed on the other end portion 521B of the first arc-shaped plate 521. The penetration direction P2 of the sound hole 502 is different to the sound traveling direction S of the speaker 400, and the penetration direction P2 of the sound hole 502 intersects the sound traveling direction S of the speaker 400. The two side plates 522 are respectively disposed on two opposite sides of the first arc-shaped plate 521, and connected to the first arc-shaped plate 521. Thus, the second inner space 501 is mutually defined by the first arc-shaped plate 521, the two side plates 522 and the case 200.

In this embodiment, the breathable membrane 600 completely covers the through hole 211. For example, as shown in FIG. 7, the waterproof breathable membrane 600 covers both the inner surface 200N of the case 200 and the through hole 211 for easily achieving the purpose of completely covering the through hole 211. However, in other embodiment, the waterproof breathable membrane also can be optioned to cover both the outer surface of the base and the through hole, or only to be fully filled in the through hole for achieving the purpose of completely covering the through hole.

Sixth Embodiment

Figure 8:
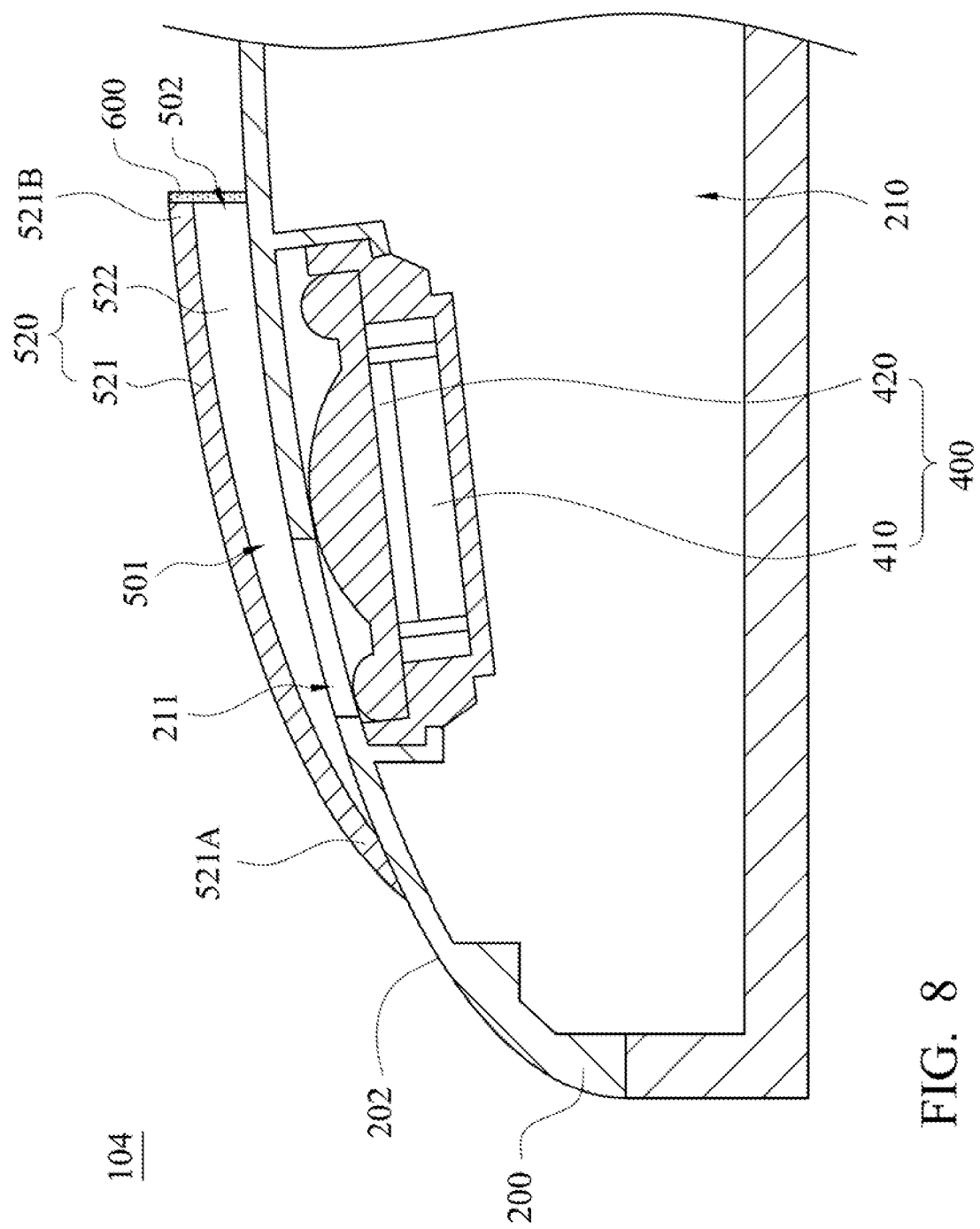
FIG. 8 is a cross sectional view of an electronic device according to a sixth embodiment of the disclosure, wherein the crossed location is the same as FIG. 3.

FIG. 8 is a cross sectional view of an electronic device 105 according to a sixth embodiment of the disclosure, wherein the crossed location is the same as FIG. 3. The electronic device 105 of the sixth embodiment is substantially same as the electronic device 104 of the fifth embodiment except that the waterproof breathable membrane 600 in the sixth embodiment completely covers the sound hole 502. For example, as shown in FIG. 8, the waterproof breathable membrane 600 completely covers both the outer surface of the supporting stand 520 and the sound hole 502 for easily achieving the purpose of completely covering the sound hole 502. However, in other embodiment, the waterproof breathable membrane also can be optioned to cover both the inner surface of the supporting stand and the sound hole, or only to be fully filled in the sound hole for achieving the purpose of completely covering the sound hole.

Seventh Embodiment

Figure 9A:
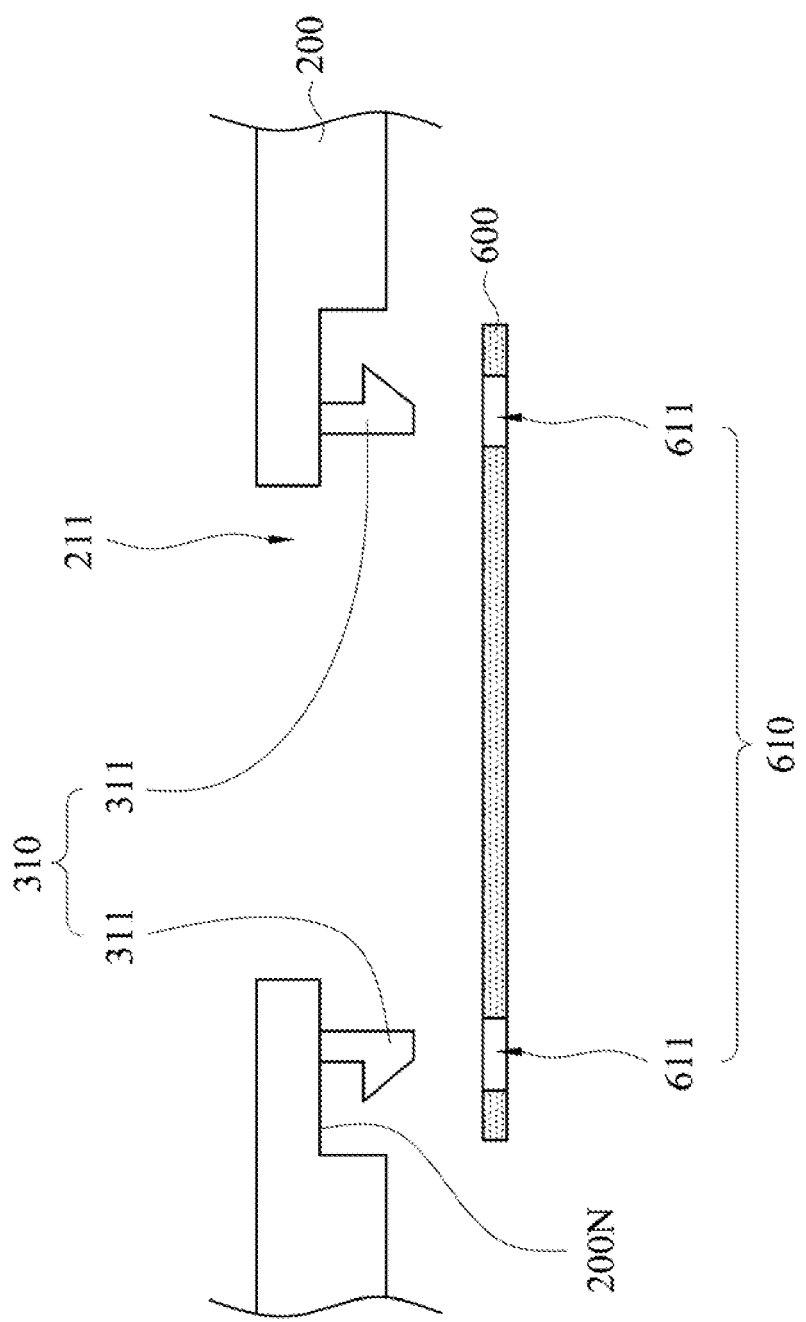
FIG. 9A is a partial disassembling view of a waterproof breathable membrane and a case according to one variation of a seventh embodiment of the disclosure.

The seventh embodiment discloses one variation of the waterproof breathable membrane 600 completely covering the through hole 211, thus, the disclosure in the seventh embodiment also can be implemented on the first embodiment, the third embodiment and the fifth embodiment mentioned above. FIG. 9A is a partial disassembling view of a waterproof breathable membrane 600 and a case 200 according to one variation of a seventh embodiment of the disclosure. As shown in FIG. 9A, the waterproof breathable membrane 600 is formed with a first fastening structure 610, and the case 200 is formed with a second fastening structure 310. Thus, when the first fastening structure 610 and the second fastening structure 310 are engaged with each other, the waterproof breathable membrane 600 fixedly covers the through hale 211.

In details, see FIG. 9A, the first fastening structure 610 includes two opening slits 611, and the opening slits 611 are respectively arranged on the two opposite sides of the waterproof breathable membrane 600. However, the present disclosure is not limited to the type and the location of the first fastening structure. The second fastening structure 310 includes two hooks 311, and the hooks 311 are arranged on the inner surface 200N respectively neighboring to two opposite edges of the through hole 211. However, the present disclosure is not limited to the type and the location of the second fastening structure, for example, the hooks can be disposed as the outer surface of the case as well. Thus, after the waterproof breathable membrane 600 is stretched for allowing the hooks 311 being respectively inserted into the opening slits 611, the waterproof breathable membrane 600 is tightened and fixed on the inner surface 200N of the case 200, and covers the through hole 211 completely.

Figure 9B:
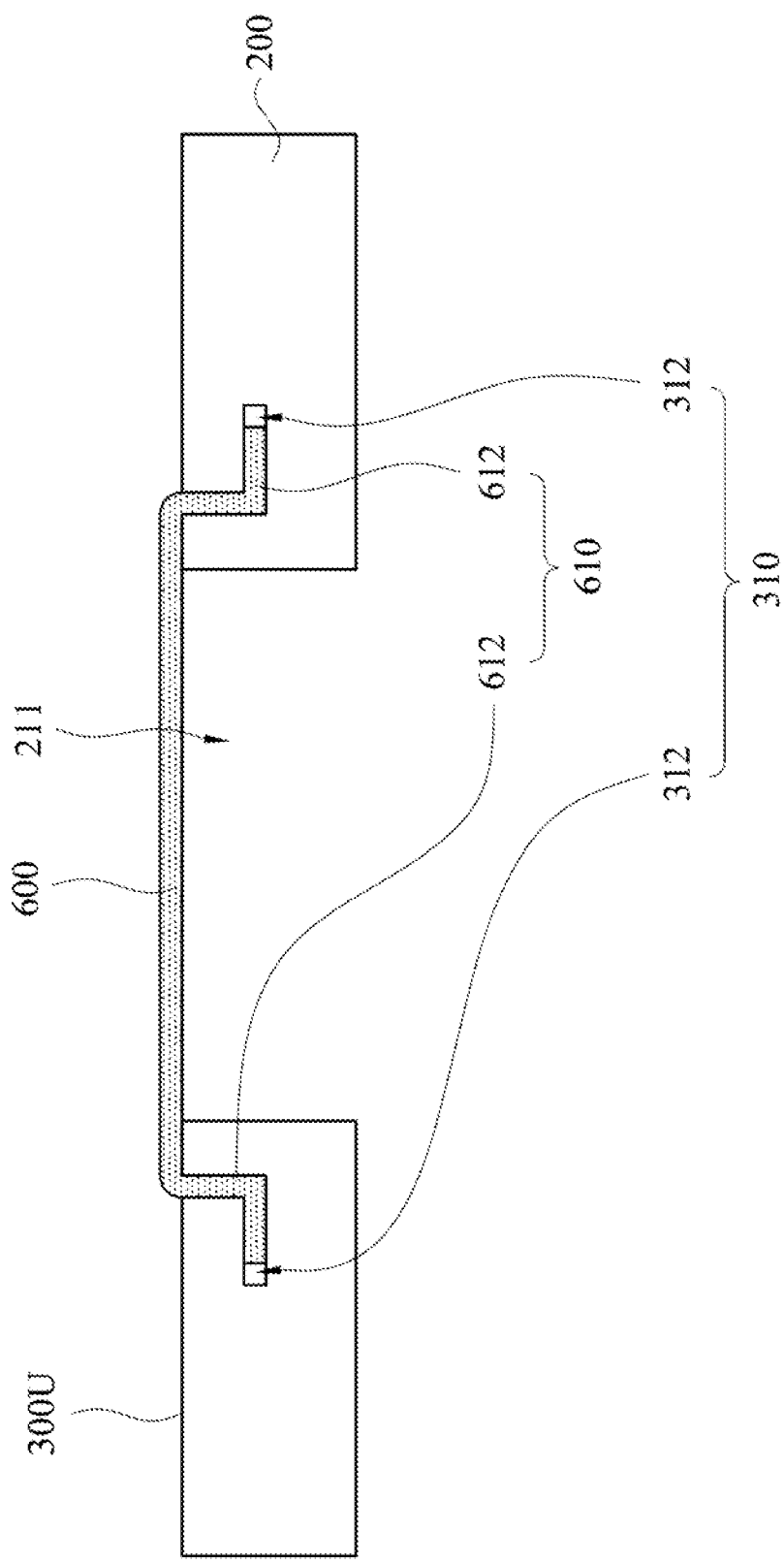
FIG. 9B is a partial assembling view of a waterproof breathable membrane and a case according to another variation of the seventh embodiment of the disclosure.

FIG. 9B is a partial assembling view of a waterproof breathable membrane 600 and a case 200 according to another variation of the seventh embodiment of the disclosure. In another variation of the seventh embodiment, specifically, the first fastening structure 610 of FIG. 9B includes two lugs 612. The lugs 612 respectively extend outwards from two opposite edges of the waterproof breathable membrane 600. However, the present disclosure is not limited to the type and the location of the first fastening structure. The second fastening structure 310 includes two recesses 312. The recesses 312 are arranged on the outer surface 200U of the case 200 respectively neighboring to two opposite edges of the through hole 211. However, the present disclosure is not limited to the type and the location of the second fastening structure, for example, the recesses can be disposed as the inner surface of the case as well. Thus, after the lugs 612 of the waterproof breathable membrane 600 are inserted and fixed in the recesses 312 respectively, the waterproof breathable membrane 600 is tightened and fixed on the outer surface 200U of the case 200, and covers the through hole 211 completely.

Eighth Embodiment

Figure 10A:
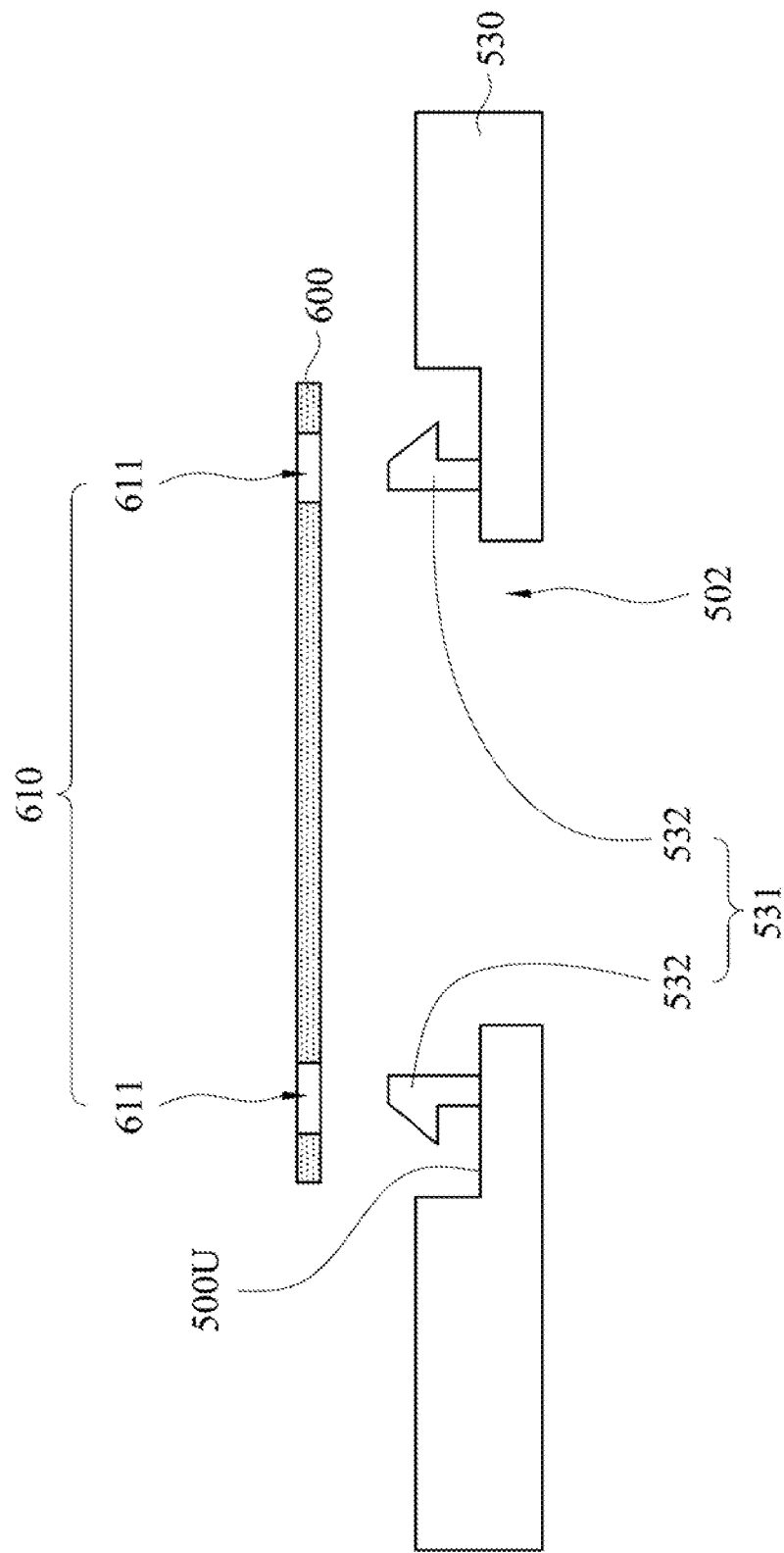
FIG. 10A is a partial disassembling view of a waterproof breathable membrane and a supporting stand according to one variation of an eighth embodiment of the disclosure.

The eighth embodiment discloses one variation of the waterproof breathable membrane 600 completely covering the sound hole 502, thus, the disclosure in the Eighth embodiment also can be implemented on the second embodiment, the fourth embodiment and the sixth embodiment mentioned above. FIG. 10A is a partial disassembling view of a waterproof breathable membrane 600 and a supporting stand 530 according to one variation of an eighth embodiment of the disclosure. As shown in FIG. 10A, the waterproof breathable membrane 600 is formed with a first fastening structure 610, and the supporting stand 530 is formed with a third fastening structure 531. Thus, when the first fastening structure 610 and the third fastening structure 531 are engaged with each other, the waterproof breathable membrane 600 fixedly covers the sound hole 502.

In details, see FIG. 10A, the first fastening structure 610 includes two opening slits 611, and the opening slits 611 are respectively arranged on the two opposite sides of the waterproof breathable membrane 600. However, the present disclosure is not limited to the type and the location of the first fastening structure. The third fastening structure 531 includes two hooks 532, and the hooks 532 are arranged on the outer surface 500U respectively neighboring to two opposite edges of the sound hole 502. However, the present disclosure is not limited to the type and the location of the second fastening structure, for example, the hooks can be disposed as the inner surface of the supporting stand as well. Thus, after the waterproof breathable membrane 600 is stretched for allowing the hooks 311 being respectively inserted into the opening slits 611, the waterproof breathable membrane 600 is tightened and fixed on the outer surface 200U of the supporting stand 530, and covers the sound hole 502 completely.

Figure 10B:
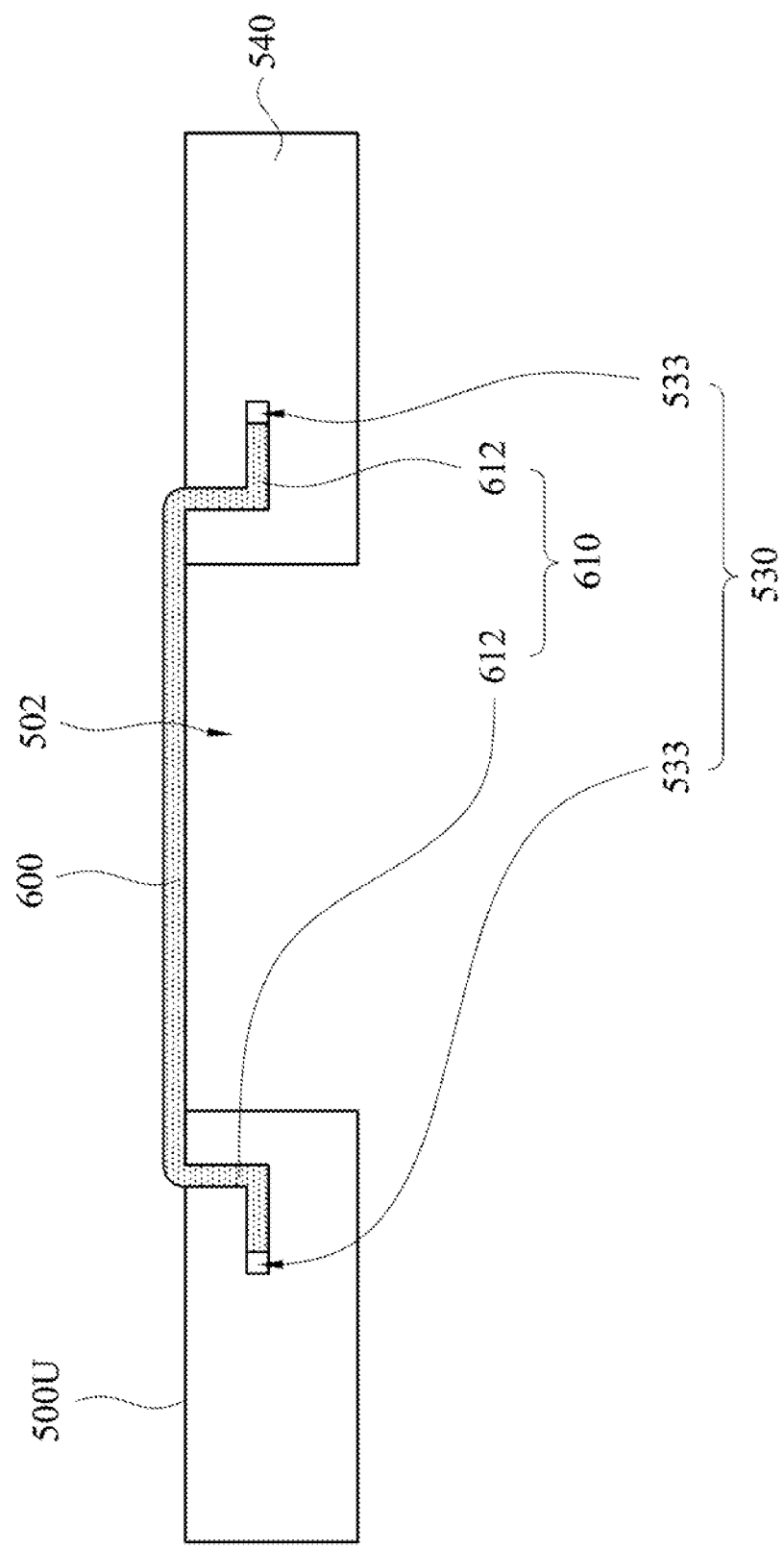
FIG. 10B is a partial assembling view of a waterproof breathable membrane and a supporting stand according to another variation of the eighth embodiment of the disclosure.

FIG. 10B is a partial assembling view of a waterproof breathable membrane 600 and a supporting stand 540 according to another variation of the eighth embodiment of the disclosure. In another variation of the eighth embodiment, specifically, the first fastening structure 610 of FIG. 10B includes two lugs 612. The lugs 612 respectively extend outwards from two opposite edges of the waterproof breathable membrane 600. However, the present disclosure is not limited to the type and the location of the first fastening structure. The third fastening structure 531 includes two recesses 533. The recesses 533 are arranged on the outer surface 500U of the supporting stand 540 respectively neighboring to two opposite edges of the sound hole 502. However, the present disclosure is not limited to the type and the location of the third fastening structure. Thus, after the lugs 612 of the waterproof breathable membrane 600 are inserted and fixed in the recesses 533 respectively, the waterproof breathable membrane 600 is tightened and fixed on the outer surface 500U of the supporting stand 540, and covers the sound hole 502 completely.

Ninth Embodiment

Figure 11:
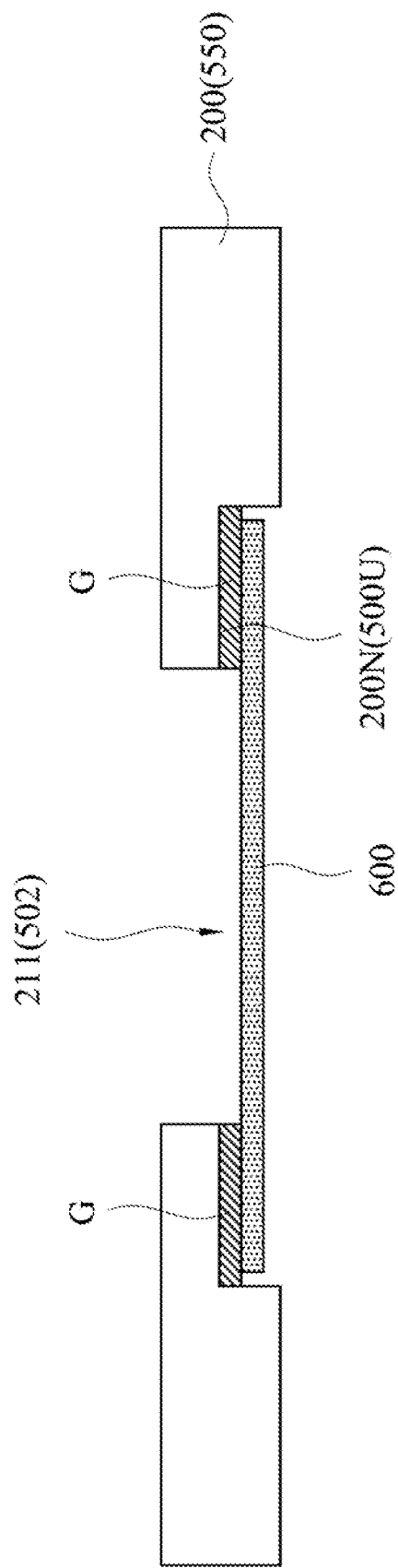
FIG. 11 is a partial assembling view of a waterproof breathable membrane and a case (or a supporting stand) according to the ninth embodiment of the disclosure.

FIG. 11 is a partial assembling view of a waterproof breathable membrane 600 and a case 200 (or a supporting stand 550) according to the ninth embodiment of the disclosure. In the ninth embodiment, by using an adhesive layer G bonded between the waterproof breathable membrane 600 and the case 200, the waterproof breathable membrane 600 is coupled on the inner surface 200N of the case 200, and the waterproof breathable membrane 600 fixedly covers the through hole 211 completely; otherwise, by using an adhesive layer G bonded between the waterproof breathable membrane 600 and the supporting stand 550, the waterproof breathable membrane 600 is coupled on the outer surface 500U of the supporting stand 550, and the waterproof breathable membrane 600 fixedly covers the sound hole 502 completely In the waterproof breathable membrane of all embodiments mentioned above, the material, of the waterproof breathable membrane is different to the material of the supporting stand. For example, the material of the supporting stand can be rubber, plastic and alike, and the material of the waterproof breathable membrane can be polymer waterproof material, e.g., polytetrafluoroethene. Also, compared to the thickness of the supporting stand, that is, a minimum linear distance from the outer surface of the supporting stand to the inner surface thereof, the waterproof breathable membrane s merely a thin film, and the thickness of the waterproof breathable membrane is in a range of 0.01 mm to 0.25 mm.

Moreover, in the supporting stand of all embodiments mentioned above, the supporting stand and the case are integrally formed as one; however, the present disclosure is not limited thereto, and the supporting stand also can be detachably disposed on the case.

What shall be understood is that the electronic device of the disclosure can select not to use the conventional sound-outlet decoration cover mentioned in prior art, and because the waterproof breathable membrane blocks the through hole from communicated with the first inner space, the electronic device of the disclosure veils sound holes from the front surface or rear surface of the case thereof so as to simplify and beautify the external appearance of the electronic device.

Finally, the embodiments in the foregoing is not used for limiting the present disclosure, various modifications and variations may be made to the structure of the present disclosure are protected in the present disclosure by those skilled in this art without departing from the scope or spirit of the disclosure. Therefore, the scope of patent protection of the present disclosure is based on the scope of the attached patents.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
    a case having a front surface, a rear surface being opposite to the front surface, a first inner space disposed between the front surface and the rear surface, and a through hole disposed on the rear surface and connected to the first inner space;
    a speaker disposed in the first inner space, and producing sound waves outwards the case from the through hole;
    a supporting foot pad convexly attached on the rear surface of the case for supporting the case standing on a placement plane, the supporting foot pad covering the rear surface of the case and the through hole, and the supporting foot pad having at least one sound hole and a second inner space connected to the at least one sound hole and the through hole; and
    at least one waterproof breathable membrane covering one of the through hole and the at least one sound hole.

2. The electronic device of claim 1, wherein a penetration direction of the at least one sound hole of the supporting foot pad is as same as a penetration direction of the through hole.

3. The electronic device of claim 1, wherein the at least one sound hole is disposed on one side of the supporting foot pad farthest away from the rear surface of the case.

4. The electronic device of claim wherein a penetration direction of the at least one sound hole of the supporting foot pad intersects a penetration direction of the through hole.

5. The electronic device of claim 1, wherein the at least one sound hole is disposed on one side of the supporting foot pad adjoined to the rear surface of the case.

6. The electronic device of claim 1, wherein the number of the at least one sound hole and the at least one waterproof breathable membrane respectively are plural, and the sound holes are respectively disposed on two opposite sides of the supporting foot pad adjoined to the rear surface of the case and are respectively covered by the waterproof breathable membranes.

7. The electronic device of claim 1, wherein the number of the at least one sound hole are plural, the sound holes are respectively disposed on two opposite sides of the supporting foot pad adjoined to the rear surface of the case, and the waterproof breathable membrane covers the through hole.

8. The electronic device of claim 1, wherein the waterproof breathable membrane is formed with a first fastening structure, and the case is formed with a second fastening structure,
    wherein when the first fastening structure and the second fastening structure are engaged with each other, the waterproof breathable membrane fixedly covers the through hole.

9. The electronic device of claim 1, wherein the waterproof breathable membrane is formed with a first fastening structure, and the supporting foot pad is formed with a third fastening structure,
    wherein when the first fastening structure and the third fastening structure are engaged with each other, the waterproof breathable membrane fixedly covers the sound hole.

10. The electronic device of claim 1, further comprising:
    an adhesive layer enabling the waterproof breathable membrane to fixedly cover the through hole or the at least one sound hole.

11. The electronic device of claim 1, wherein the waterproof breathable membrane comprises polymer waterproof material of polytetrafluoroethene.

12. The electronic device of claim 1, wherein a thickness of the waterproof breathable membrane in a range of 0.01 mm to 0.25 mm.

13. The electronic device of claim 1, wherein the waterproof breathable membrane is a diaphragm.

14. The electronic device of claim 1, wherein the speaker comprises:
    a driver element; and
    a diaphragm connected to the driver element, and disposed between the through hole and the driver element.

* * * * *